UNITED STATES PATENT OFFICE.

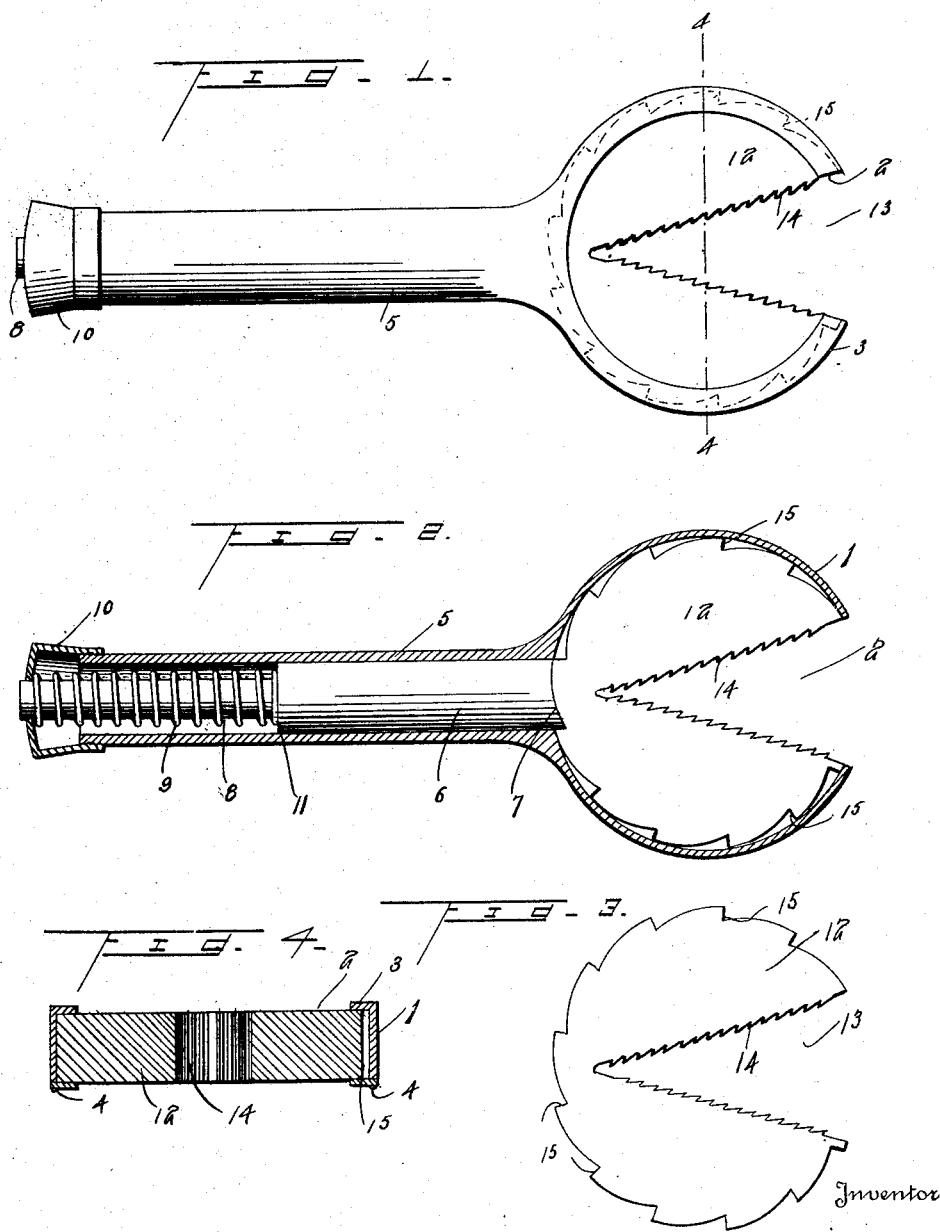

WILLIAM M. HANSEN, OF LEWISVILLE, IDAHO.

WRENCH.

1,223,277.  Specification of Letters Patent.  Patented Apr. 17, 1917.

Application filed November 15, 1916. Serial No. 131,431.

*To all whom it may concern:*

Be it known that I, WILLIAM M. HANSEN, a citizen of the United States, residing at Lewisville, in the county of Jefferson and State of Idaho, have invented certain new and useful Improvements in Wrenches; and I do hereby declare the following to be a full, clear, and exact description of the invention, such as will enable others skilled in the art to which it appertains to make and use the same.

This invention relates to new and useful improvements in wrenches and one of its objects is the provision of a device of this character which shall be simple, durable and efficient, and which may be manufactured and sold at a comparatively low cost.

Another object of this invention is to provide a barrel having an opening therein and having a nut or pipe engaging member which is provided with a V-shaped opening having teeth on the walls thereof for engaging a pipe or nut.

A further object of this invention is to provide a pipe or nut engaging member rotatably mounted within the barrel and having teeth formed on the periphery thereof adapted to be engaged by a dog to prevent relative movement of the nut or pipe engaging member in one direction with relation to the barrel and which will permit the barrel to turn freely on the nut or pipe engaging member in the opposite direction.

A still further object of this invention is to provide a hollow handle formed upon the barrel to slidably receive the dog and having a coiled spring for normally holding the dog in engagement with the teeth upon the nut or pipe engaging member.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which—

Figure 1 is a side elevation of a wrench, constructed in accordance with my invention, Fig. 2 is a longitudinal sectional view of the same, Fig. 3 is a plan view of the nut or pipe engaging member, and Fig. 4 is a sectional view taken on the line 4—4 of Fig. 1.

Referring in detail to the drawing, the numeral 1 indicates a barrel having an opening 2 and annular flanges 3 located on the edges thereof. One of the flanges 3 is formed integrally to the barrel 1 and the other flange is detachably secured to the barrel 1 by means of screws, bolts or like fasteners 4.

A hollow handle 5 is formed upon the barrel 1 at a point directly opposite the mouth of the V-shaped opening 2 and the barrel 1 is provided with an opening in the wall thereof to establish communication from the interior of the handle to the interior of the barrel. A dog 6 is located within the hollow handle 5 and has one end beveled as illustrated at 7 and located within the opening of the barrel 1 and has its opposite end reduced to form a cylindrical extension 8, on which is mounted a coiled spring 9.

A cap 10 is threaded to the end of the hollow handle 5 and has an opening therein to slidably receive the outer end of the cylindrical extension 8, having one end of the coiled spring bearing against the wall of the cap and the opposite end bearing against the shoulder 11 formed by the enlarged portion of the dog 6.

A circular nut or pipe engaging member 12 is provided with a substantially V-shaped opening 13, on the walls of which are formed a plurality of teeth 14 for engaging a nut or pipe.

The nut or pipe engaging member 12 is rotatably mounted within the barrel 1 and held therein by the flanges 3 and has formed upon the periphery thereof a plurality of teeth 15 adapted to be engaged by the beveled end 7 of the dog 6 to prevent relative movement of the nut or pipe engaging member in one direction in relation to the barrel and which will permit the barrel to turn freely of the nut or pipe engaging member in the other direction.

In operation, the V-shaped opening 13 of the nut engaging member 12 is brought in registration with the opening 2 of the barrel 1 so that a pipe or nut may be engaged by the teeth 14 of the nut or pipe engaging member 12. By moving the handle 5 in one direction, the dog 6 engages the teeth 15 upon the periphery of the nut engaging member and causes the same to rotate or turn with the barrel. Upon moving the handle in the opposite direction the dog 6 slides freely over the teeth 15 and allows the nut engaging member 12 to remain stationary while the barrel 1 turns freely thereon, so that after the handle 5 has been moved a complete stroke it can be moved in the opposite direction without affecting the grip of the nut engaging member upon the nut or pipe.

While I have shown and described the preferred embodiment of my invention, it will be understood that minor changes in construction, combination and arrangement of parts may be made without departing from the spirit and scope of the invention, as claimed.

Having thus described my invention, what I claim is:—

A wrench comprising a circular barrel, a hollow handle formed on said barrel, said barrel having oppositely disposed openings and one of said openings being in registration with the hollow handle, annular flanges formed on the edges of the barrel, a circular nut engaging member rotatably mounted in the barrel and having a V-shaped opening, said opening opening out through one edge of said member to receive a nut through the opening in the barrel, teeth formed on the periphery of said member, a dog slidable in said handle and having one end beveled to engage the teeth, an extension formed on the other end of the dog and extending exteriorly of the handle, a cap secured to the handle and having an opening to slidably receive the extension, and a coiled spring mounted on the extension and bearing against the dog and cap for normally urging the dog in engagement with the teeth of the member.

In testimony whereof I affix my signature in presence of two witnesses.

WILLIAM M. HANSEN.

Witnesses:
Wm. W. Selck, Sr.,
Warren L. Shurtliff.